Nov. 11, 1941.  P. E. TWISS  2,262,520
RECORDING INSTRUMENT
Filed Aug. 25, 1939
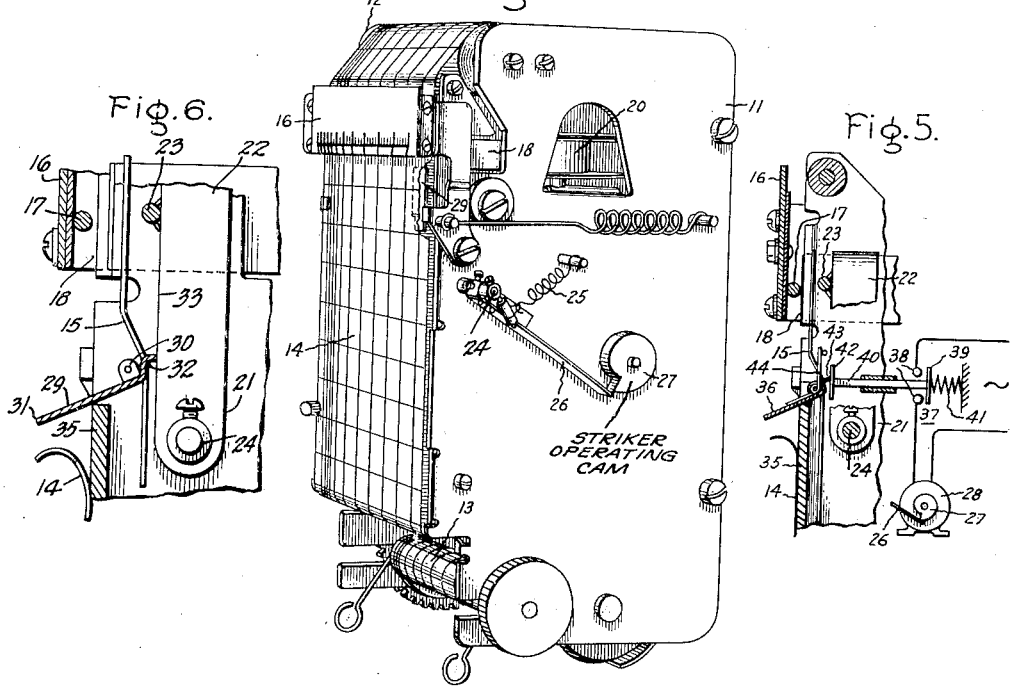
Inventor:
Paul E. Twiss,
by Harry E. Dunham
His Attorney.

Patented Nov. 11, 1941

2,262,520

UNITED STATES PATENT OFFICE 2,262,520

RECORDING INSTRUMENT

Paul E. Twiss, Lynn, Mass., assignor to General Electric Company, a corporation of New York Application August 25, 1939, Serial No. 291,909

4 Claims. (Cl. 234—68)

My invention relates to recorders and concerns particularly curve drawing, measuring and indicating instruments of the type not using a pen.

My invention is particularly applicable to recorders of the type having a moving chart, a marking sheet or ribbon along the surface of the chart, a deflecting pointer, instrument arm or stylus, movable along the surface of the chart, a platen, and a striker for driving the other parts against the platen in order that the portion of the surface of the chart immediately adjacent the movable pointer is brought in contact with the marking material for producing a mark on the chart representing the position of the pointer and thus representing the measurement to be recorded.

My invention concerns particularly recorders of the type disclosed in the copending application of Ralph G. Arey, Serial No. 273,085, filed May 11, 1939, and assigned to the same assignee as the present application, in which the marking ribbon and the stylus or movable instrument arm are placed at opposite sides of the chart in order to guard against soiling of the stylus by the marking material and consequent sticking of the stylus. Such recorders have a mechanism for intermittently driving the striker and if the recorder should be operated without any chart therein or after the original chart has been used up, the chart would no longer serve to separate the stylus and the marking ribbon.

It is an object of my invention to provide arrangements for preventing reciprocation of the striker whenever there is no chart in recording position in the recorder, for the purpose of preventing damage of the marking ribbon as well as obviating the necessity for cleaning the instrument arm in case the chart should be consumed or the recorder should be started without any chart in the recording position.

Other and further objects and advantages will become apparent as the description proceeds.

My invention will be understood more readily from the following detailed description when considered in connection with the accompanying drawing and those features of the invention which are believed to be novel and patentable will be pointed out in the claims appended hereto. In the drawing Figure 1 is a perspective view of a recorder utilizing a striker-blocking arrangement forming one embodiment of my invention. Figure 2 is a fragmentary detail front elevation of a portion of the apparatus of Figure 1 including the striker-blocking arrangement which stops the striker operation whenever there is no chart in recording position. Figure 3 is a fragmentary side elevation partially in cross-section of the apparatus of Figure 2 showing the position of parts when there is no record chart in recording position. Figure 4 is a fragmentary side elevation corresponding to Figure 3 to show the position of parts when there is an adequate length of chart in the recorder. Figure 5 is a fragmentary detail view and diagrammatic representation of a modification in the arrangement of Figures 2 to 4. Figure 6 is a fragmentary enlarged view of the latch arrangement of Figs. 1-4. Like reference characters are utilized throughout the drawing to designate like parts.

Figure 1 illustrates a recorder having a suitable frame with side plates 11 carrying suitable means for rotatably supporting a supply spool 12 of record strip chart at the upper end and a re-roll spool 13 at the lower end, together with suitable guides for causing a length 14 of the strip chart to be stretched in a flat vertical sheet at the front of the recorder. Inside the recorder casing and not shown, is a deflecting measuring instrument of a conventional type, for example, an ammeter or a voltmeter having a deflecting arm or pointer 15 which might be called a stylus and is arranged to be angularly deflected transversely along the back surface of the recorder sheet 14 in response to variations in a quantity being measured or in response to indications to be recorded. In front of the strip chart 14 there is a scale and platen support 16, the front of which may carry a scale and the back of which includes a platen or ridge 17 having a circular or triangular cross-section so as to form a straight edge which provides a single line contact transversely across the front of the chart 14. Interposed between the straight edge platen 17 and the front surface of the strip chart 14 there is a strip of marking material 18 which may, if desired, be in the form of a movable ribbon impregnated with a suitable marking material, such as a typewriter ribbon, for example, carried on a pair of spools 20, only one of which is shown (Figure 1).

For intermittently producing marks on the front surface of the strip chart 14, an inverted U-shaped striker 21 is provided comprising a horizontal yoke piece 21' and a pair of arms 22, only one of which is shown, carrying a striker rod 23 extending transversely along the back of the sheet 14 substantially parallel to the straight edge or platen 17. The striker rod 23 may be secured to the arms 22 in any desired manner as by brazing, soldering or welding. The striker rod 23 is behind the movable instrument arm 15, and the side arms 22 of the striker are carried at the lower end by an angularly oscillating shaft 24. The shaft 24 is biased by means of a spring 25 to a position in which the striker rod 23 presses the instrument arm 15 toward the platen 17. For causing the striker 21 to oscillate I provide a leaf spring arm 26 secured to the shaft 24 and a rotatable cam 27 engaging the free end of the arm 26. Suitable means are provided for rotating the cam, such as a shaft geared to a mechanism for rewinding the roll 13, or, if desired, a separate motor 28 may be provided (Figure 5).

It will be understood that the chart 14 is advanced in accordance with a suitable quantity representing one of the coordinates of the graph to be reproduced. Usually the chart 14 is advanced at a uniform rate, in accordance with the passage of time. The successive positions of the instrument arm 15 across the chart are to be recorded. Since the instrument arm 15 is relatively narrow, it also tends to make a line contact with the back surface of the chart 14. Furthermore, since the stylus 15 is transverse to the straight edge or platen 17, relatively small adjacent areas approximating points at the front of the strip 14 and the back of the marking ribbon 18 are brought into contact whenever the striker 21 is driven forward. The cam 27 is rotated at a suitable rate of speed in relation to the chart speed such that a substantially continuous, though actually intermittent, line of marks is produced on the front surface of the strip 14.

When there is sufficient chart in the recorder with a length 14' feeding down from the supply spool the parts are in the position shown in Fig. 4. However, after the chart 14 runs out, as represented in Figures 2 and 3, there is nothing interposed between the movable arm 15 and the marking ribbon 18. To prevent the movable instrument arm 15 from being driven against the ribbon 18 under these circumstances, an automatic striker-operation-preventing latch 29 is provided which is pivoted about a horizontal axis 30 a short distance in front of one of the side arms 22 of the reciprocating striker 21. The latch 29, as shown in Fig. 4, includes a normally upwardly extending arm 31 and a normally downwardly extending heel 32 which is substantially in line with the center of the pivot axis 30. The pivot axis 30 is so located that when there is strip chart in the recorder, as shown in Figure 4, the arm 31 rests against the back surface of the chart 14 and holds the latch in a vertical position with the heel 32 downward. The arm 31 is slightly off center and forward with respect to the pivot axis 30, so that when the chart 14 runs out, as shown in Fig. 3, the arm 31 drops forward and downward causing the heel 32 to swing backwards into the path of the front edge 33 of the striker arm 22. A sufficient opening 34 in the front plate 35 is provided to permit the arm 31 to drop slightly below horizontal. Since the heel 32 is substantially on a line with the pivot axis 30 and the striker-operation preventing latch 29 drops to the striker-operation preventing position illustrated in Figure 3, the heel 32 is then slightly higher than the pivot axis 30 and horizontally applied force cannot move the heel 32. The edge 33 of the striker arm is held back by the tip of the heel 32, thus preventing the striker from moving the instrument arm 15. It will be understood, of course, that when a new roll of strip chart is inserted in the recorder, the arm 31 will be lifted so that the strip chart can hold the latch 29 in the position shown in Figure 4.

Although in the foregoing figures and description I have disclosed a striker-blocking arrangement in the form of a mechanical latch for preventing contact between the instrument arm 15 and the marking ribbon 18 in the event of lack of strip chart, it will be understood that my invention is not limited to the precise arrangement shown and obviously includes any suitable mechanism for preventing operation of the striker 21 when there is no record strip in proper recording position. For example, instead of employing a mechanical striker-operation-preventing arrangement I may employ an electrical striker-operation-preventing arrangement, a form of which is illustrated in Figure 5. In the arrangement of Figure 5 a suitable means such as a latch 36 is so arranged as to interrupt the electrical circuit of the cam driving motor 28 whenever the chart 14 is not in recording position. The latch means 36 may, if desired, be similar to the latch 29, described in connection with the preceding figures, but the latch 36 is placed nearer the center of the front plate of the instrument in order not to interfere with the striker arm 22. For example, a switch 37 may be provided having a pair of stationary contacts 38 interposed in the energizing circuit of the motor 28, and a movable contact 39 carried by a rectangularly movable rod 40 spring biased by means of a spring 41 to the position in which the circuit is closed through the contacts 38 and 39. At the end of the rod 40 a button 42 may be provided, which is adapted to be deflected to the right by the heel 43 of the latch 36 when the latch 36 is in the downward or striker-operation-preventing position, but is permitted to move to the left, closing the contacts 37 and 38, when the latch 36 is in the upward or normal chart position. To assist gravity in moving the latch to the striker-operation-preventing position a light wire spring 44 may be provided.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A recorder of the type having a chart adapted to be moved progressively, said recorder comprising a stylus on one side of the plane at which the chart is positioned and movable adjacent the surface of the chart transversely to the direction of motion of the chart, a platen extending transversely across the said chart on the other side thereof, a strip of marking material between said platen and the plane of said chart, a striker adapted to be oscillated for intermittently driving said stylus against the chart to press the marking material between the chart and the platen at the point of intersection of the stylus and the platen, and a latch pivoted adjacent said striker, having an arm normally resting against the chart to hold the latch in inoperative position, said latch having a heel adapted to swing into the path of the striker to prevent movement thereof when there is no chart in recording position and said latch arm is permitted to swing out, whereby impact of the stylus upon the marking material is prevented.

2. In a recorder of the type having a chart adapted to be moved progressively, a stylus on one side of the chart movable adjacent the surface of the chart transversely to the direction of motion of the chart, a platen extending transversely across the chart on the opposite side thereof, a strip of marking material between said platen and said stylus, and a striker adapted to be oscillated for intermittently driving said stylus against the chart to press the marking material between the chart and the platen at the point of intersection of the stylus and the platen, the combination of said marking strip with said striker and a latch pivoted adjacent said striker having an arm normally resting against the chart to hold the latch in inoperative position, and having a heel adapted to swing into the path of the striker to prevent movement thereof when there is no chart in recording position and said latch arm is permitted to swing out, whereby impact of the stylus upon the marking material is prevented.

3. In a recorder of the type having a chart adapted to be moved progressively, a stylus on one side of the chart movable adjacent the surface of the chart transversely to the direction of motion of the chart, a platen extending transversely across the chart on the opposite side thereof, a strip of marking material between said platen and said stylus, and a striker adapted to be oscillated for intermittently driving said stylus against the chart to press the marking material between the chart and the platen at the point of intersection of the stylus and the platen, the combination of a movable arm adapted to rest against the chart when there is chart material in recording position and to swing into a striker-operation-preventing position when there is no chart in recording position, and means movable in response to movement of said arm for preventing the operation of the striker when said arm is in the striker-operation-preventing position.

4. In a recorder of the type having a chart adapted to be moved progressively, a stylus on one side of the chart movable adjacent the surface of the chart transversely to the direction of motion of the chart, a platen extending transversely across the chart on the opposite side thereof, a strip of marking material between said platen and said stylus, a striker adapted to be oscillated for intermittently driving said stylus against the chart to press the marking material between the chart and the platen at the point of intersection of the stylus and the platen, an electric motor and a circuit therefor for operating said striker, the combination of a movable arm adapted to rest against the chart when there is a chart in recording position and to swing into a striker-operation-preventing position when there is no chart in recording position, and an electric switch operatively associated with said arm and having contacts in the circuit of said motor openable in response to swinging of said arm for preventing the operation of the motor-driven striker when said arm is in the striker-operation-preventing position.

PAUL E. TWISS.